(12) United States Patent
Smith et al.

(10) Patent No.: US 7,749,928 B2
(45) Date of Patent: *Jul. 6, 2010

(54) USE OF PRE-COATED MAT FOR PREPARING GYPSUM BOARD

(75) Inventors: Russell Smith, Covington, GA (US); Brian Randall, Lawrenceville, GA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/427,903

(22) Filed: Apr. 22, 2009

(65) Prior Publication Data

US 2009/0275250 A1 Nov. 5, 2009

Related U.S. Application Data

(63) Continuation of application No. 10/798,891, filed on Mar. 12, 2004.

(51) Int. Cl.
B32B 13/02 (2006.01)
B32B 13/04 (2006.01)
B32B 13/14 (2006.01)
E04C 2/00 (2006.01)

(52) U.S. Cl. .............. 442/386; 428/294.7; 442/180; 442/256; 442/279

(58) Field of Classification Search ............... None
See application file for complete search history.

(56) References Cited

U.S. PATENT DOCUMENTS

| | | | |
|---|---|---|---|
| 1,511,500 A | 10/1924 | Brookby | |
| 2,906,660 A | 9/1959 | Hungerford et al. | |
| 3,012,929 A | 12/1961 | Jackson | |
| 3,050,427 A | 8/1962 | Slayter et al. | |
| 3,103,461 A | 9/1963 | Smith et al. | |
| 3,155,567 A | 11/1964 | Harr | |
| 3,228,825 A | 1/1966 | Waggoner | |
| 3,455,710 A | 7/1969 | Nitzsche et al. | |
| 3,516,882 A | 6/1970 | Cummisford | |
| 3,623,895 A | 11/1971 | Nitzsche et al. | |
| 3,645,707 A | 2/1972 | Philipps | |
| 3,676,094 A | 7/1972 | Russell | |
| 3,760,458 A | 9/1973 | Pitt | |

(Continued)

FOREIGN PATENT DOCUMENTS

DE 1901206 A1 11/1969

(Continued)

OTHER PUBLICATIONS

Machine Translation of DE 1509853; Printed Mar. 11, 2009.

(Continued)

*Primary Examiner*—Jennifer A Chriss
(74) *Attorney, Agent, or Firm*—Joel T. Charlton

(57) ABSTRACT

A gypsum board which comprises a set gypsum core sandwiched between and faced with fibrous mats, wherein a free surface of one of said mats is pre-coated with a combination of a mineral pigment, optionally an inorganic adhesive binder and an organic binder, preferably a hydrophobic, UV resistant polymer latex adhesive binder applied to said surface as an aqueous coating composition, said aqueous coating composition upon drying and setting providing a pre-coated mat satisfying certain morphology requirements.

8 Claims, 3 Drawing Sheets

U.S. PATENT DOCUMENTS

| | | | |
|---|---|---|---|
| 3,766,003 A | 10/1973 | Schuller et al. | |
| 3,824,147 A | 7/1974 | Baird | |
| 3,838,995 A | 10/1974 | Smith | |
| 3,876,968 A | 4/1975 | Barnes et al. | |
| 3,905,067 A | 9/1975 | Keib et al. | |
| 3,935,021 A | 1/1976 | Greve et al. | |
| 3,945,965 A | 3/1976 | Ramig, Jr. et al. | |
| 3,947,398 A | 3/1976 | Williams | |
| 3,993,822 A | 11/1976 | Knauf et al. | |
| 4,067,939 A | 1/1978 | Lowe et al. | |
| 4,112,174 A | 9/1978 | Hannes et al. | |
| 4,136,687 A | 1/1979 | Dabroski | |
| 4,242,406 A | 12/1980 | El Bouhnini et al. | |
| 4,265,979 A | 5/1981 | Baehr et al. | |
| 4,303,722 A | 12/1981 | Pilgrim | |
| 4,327,146 A | 4/1982 | White | |
| 4,378,405 A | 3/1983 | Pilgrim | |
| 4,447,498 A | 5/1984 | Fink | |
| 4,494,990 A | 1/1985 | Harris | |
| 4,504,533 A | 3/1985 | Altenhofer et al. | |
| 4,572,861 A | 2/1986 | Garcia et al. | |
| 4,637,951 A | 1/1987 | Gill et al. | |
| 4,643,771 A | 2/1987 | Steinbach et al. | |
| 4,647,486 A | 3/1987 | Ali | |
| 4,647,496 A | 3/1987 | Lehnert et al. | |
| 4,681,798 A | 7/1987 | Gill et al. | |
| 4,681,802 A | 7/1987 | Gaa et al. | |
| 4,746,365 A | 5/1988 | Babcock et al. | |
| 4,784,897 A | 11/1988 | Brands et al. | |
| 4,810,576 A | 3/1989 | Gaa et al. | |
| 4,876,142 A | 10/1989 | Piccirillo | |
| 4,879,173 A | 11/1989 | Randall | |
| 4,916,004 A | 4/1990 | Ensminger et al. | |
| 4,943,612 A | 7/1990 | Morita et al. | |
| 4,948,647 A | 8/1990 | Burkard | |
| 5,001,005 A | 3/1991 | Blanpled | |
| 5,102,728 A | 4/1992 | Gay et al. | |
| 5,112,678 A | 5/1992 | Gay et al. | |
| 5,342,680 A | 8/1994 | Randall | |
| 5,389,716 A | 2/1995 | Graves | |
| 5,395,685 A | 3/1995 | Seth et al. | |
| 5,397,631 A | 3/1995 | Green et al. | |
| 5,401,588 A | 3/1995 | Garvey et al. | |
| 5,484,653 A | 1/1996 | Kennedy | |
| 5,529,622 A | 6/1996 | Thompson | |
| 5,718,785 A | 2/1998 | Randall | |
| 5,718,797 A | 2/1998 | Phillips et al. | |
| 5,772,846 A | 6/1998 | Jaffee | |
| 5,827,788 A | 10/1998 | Miyakoshi | |
| 5,879,486 A | 3/1999 | Philips et al. | |
| 5,883,024 A | 3/1999 | O'Haver-Smith et al. | |
| 5,962,119 A | 10/1999 | Chan | |
| 5,965,257 A | 10/1999 | Ahluwalia | |
| 5,981,406 A | 11/1999 | Randall | |
| 6,077,593 A | 6/2000 | Schlachter | |
| 6,110,575 A | 8/2000 | Haga | |
| 6,187,697 B1 | 2/2001 | Jaffee et al. | |
| 6,190,476 B1 | 2/2001 | Seecharan | |
| 6,365,533 B1 | 4/2002 | Horner, Jr. et al. | |
| 6,391,131 B1 | 5/2002 | Newman et al. | |
| 6,432,482 B1 | 8/2002 | Jaffee et al. | |
| 6,475,313 B1 | 11/2002 | Peterson et al. | |
| 6,524,679 B2 | 2/2003 | Hauber et al. | |
| 6,723,670 B2 | 4/2004 | Kajander et al. | |
| 6,770,354 B2 | 8/2004 | Randall et al. | |
| 6,808,793 B2 | 10/2004 | Randall et al. | |
| 6,838,163 B2 | 1/2005 | Smith et al. | |
| 6,875,308 B2 | 4/2005 | Kajander et al. | |
| 6,878,321 B2 | 4/2005 | Hauber et al. | |
| 6,902,797 B2 | 6/2005 | Pollock et al. | |
| 7,049,251 B2 | 5/2006 | Porter | |
| 7,300,515 B2 | 11/2007 | Porter | |
| 7,300,892 B2 | 11/2007 | Porter | |
| 7,470,338 B2 | 12/2008 | Callais et al. | |
| 2001/0009834 A1 | 7/2001 | Peng et al. | |
| 2002/0151240 A1 | 10/2002 | Smith et al. | |
| 2002/0155282 A1* | 10/2002 | Randall et al. | 428/341 |
| 2003/0031854 A1 | 2/2003 | Kajander et al. | |
| 2003/0032350 A1 | 2/2003 | Kajander et al. | |
| 2003/0054714 A1 | 3/2003 | Peng et al. | |
| 2003/0113572 A1 | 6/2003 | Deodhar et al. | |
| 2003/0114065 A1 | 6/2003 | Peng et al. | |
| 2003/0119408 A1 | 6/2003 | Choi | |
| 2003/0129903 A1 | 7/2003 | Moes | |
| 2003/0134079 A1* | 7/2003 | Bush et al. | 428/74 |
| 2003/0139111 A1 | 7/2003 | Kajander et al. | |
| 2003/0175478 A1 | 9/2003 | Leclercq | |
| 2003/0203191 A1 | 10/2003 | Randall et al. | |
| 2003/0211305 A1 | 11/2003 | Koval et al. | |
| 2004/0033749 A1 | 2/2004 | Smith et al. | |
| 2004/0043682 A1 | 3/2004 | Taylor et al. | |
| 2004/0209074 A1 | 10/2004 | Randall et al. | |
| 2004/0266303 A1 | 12/2004 | Jaffee | |
| 2004/0266304 A1 | 12/2004 | Jaffee | |
| 2005/0067082 A1 | 3/2005 | Mowry | |
| 2005/0070186 A1 | 3/2005 | Shoemake et al. | |
| 2005/0112977 A1 | 5/2005 | Choi | |
| 2005/0136241 A1 | 6/2005 | Kajander et al. | |
| 2005/0142348 A1 | 6/2005 | Kajander et al. | |
| 2005/0181693 A1 | 8/2005 | Kajander | |
| 2005/0202258 A1 | 9/2005 | Swales et al. | |
| 2005/0202742 A1 | 9/2005 | Smith et al. | |
| 2005/0266225 A1 | 12/2005 | Currier et al. | |
| 2009/0275250 A1 | 11/2009 | Smith et al. | |

FOREIGN PATENT DOCUMENTS

| | | |
|---|---|---|
| DE | 1509853 B1 | 4/1970 |
| DE | 7806114 U1 | 3/1978 |
| DE | 2808723 | 9/1979 |
| DE | 3508933 | 9/1986 |
| DE | 3508933 A1 | 10/1986 |
| EP | 0702116 A1 | 3/1996 |
| GB | 1250713 A | 10/1971 |
| GB | 2013563 A | 8/1979 |
| GB | 2022503 A | 12/1979 |
| GB | 2023687 A | 1/1980 |
| GB | 2053779 A | 2/1981 |

OTHER PUBLICATIONS

Machine Translation of DE 7806114; Printed Mar. 11, 2009.
International Search Report and Written Opinion for PCT/US2005/007763, mailed Jun. 29, 2005.
Non-Final Office Action for U.S. Appl. No. 10/798,891 Dated Nov. 14, 2005.
Final Office Action for U.S. Appl. No. 10/798,891 Dated May 2, 2006.
Non-Final Office Action for U.S. Appl. No. 10/798,891 Dated Dec. 13, 2006.
Final Office Action for U.S. Appl. No. 10/798,891 Dated Jun. 15, 2007.
Final Office Action for U.S. Appl. No. 10/798,891 Dated Jan. 25, 2008.
Non-Final Office Action for U.S. Appl. No. 10/798,891 Dated Jun. 26, 2008.
Final Office Action for U.S. Appl. No. 10/798,891 Dated Jan. 5, 2009.
Non-Final Office Action for U.S. Appl. No. 10/798,891 Dated Apr. 10, 2009.
Final Office Action for U.S. Appl. No. 10/798,891 Dated Aug. 7, 2009.
Non-Final Office Action for U.S. Appl. No. 12/241,780 Dated Dec. 15, 2009.
Translation of German Patent No. DE 3508933 A1.
Translation of European Patent No. EP 0 702 116 A1.
Final Rejection for U.S. Appl. No. 12/241,780 mailed Mar. 11, 2010.

* cited by examiner

USE OF PRE-COATED MAT FOR PREPARING GYPSUM BOARD

CROSS REFERENCE TO RELATED APPLICATION

This application is a continuation application of U.S. Ser. No. 10/798,891 filed Mar. 12, 2004, the entire contents of which are incorporated by reference herein.

FIELD OF THE INVENTION

This invention relates to the use of a pre-coated fiber mat for making fiber mat-faced gypsum board, for example, a gypsum board faced with a glass fiber mat. The invention more particularly relates to the fiber mat-faced gypsum board that is prepared with the pre-coated fiber mat. The coating on the pre-coated mat comprises a dried aqueous mixture of a mineral pigment or filler, an organic binder, preferably comprised of a hydrophobic, UV-resistant polymer latex adhesive; and, optionally a second binder comprised of an inorganic adhesive, wherein the dried coating satisfies certain coating morphology requirements.

The present invention is based on the discovery that in order to obtain a gypsum board with certain desired physical strength characteristics, the pre-coated mat used to prepare the gypsum board product must satisfy a particular set of structural properties and the process for making the board must produce the proper interface between the gypsum core and the pre-coated mat.

BACKGROUND OF THE INVENTION

Panels of gypsum wallboard which comprise a core of set gypsum sandwiched between two sheets of facing paper have long been used as structural members in the fabrication of buildings where the panels are used to form the partitions or walls of rooms, elevator shafts, stairwells, ceilings and the like.

In efforts to mitigate or overcome problems associated with the use of paper-faced gypsum wallboard in applications where moisture exposure is expected to occur, the prior art has approached the problem in various ways over the years.

One approach to the problem has been to treat the paper comprising the facing of the wallboard with a water-resistant material sometimes referred to as a water-repellant. Polyethylene emulsion is an example of a material that is used to treat paper facing to impart water-resistant characteristics. Such treatment is designed to deter delamination of the multi-ply paper facing by reducing the tendency of the paper to absorb water which is a chief cause of delamination and to deter water from penetrating through the paper to the gypsum and destroying the bond between the paper-facing and gypsum core.

Another approach to the problem has involved incorporating into the formulation from which the gypsum core is made a material that functions to impart improved water-resistant properties to the set gypsum core itself. Such an additive tends to reduce the water-absorbing tendency of the core and decrease the solubility characteristics of the set gypsum. Wax-asphalt emulsions and wax emulsions are examples of such additives.

Although improvements had been realized by the provision of gypsum wallboard prepared in accordance with these teachings, further improvements were still possible. Experience showed that even with such constructions the paper facing delaminated and the gypsum core eroded through the degrading action of moisture. The problem was particularly aggravated by warm water acting upon a gypsum core that includes either a wax emulsion or a wax-asphalt emulsion, commonly used water-resistant core additives. While cores containing such materials have relatively good water-resistant characteristics in the presence of water at room temperature, such characteristics start to fall off at temperatures in excess of 70° F. and tend to disappear in the presence of water having a temperature of about 100° F. or higher.

In another commercially successful approach, a structural panel comprising a set gypsum core sandwiched between two porous fibrous mats is provided, see U.S. Pat. No. 4,647,496. The preferred form of mat is described as a non-woven glass fiber mat formed from fiberglass filaments oriented in random pattern and bound together with a resin binder. Such panels differ from conventional gypsum wallboard in that the fibrous mat is substituted for paper as the facing material(s) of the gypsum core. In such constructions, the set gypsum from the core extends at least part-way into the fibrous mat facer to form an integral attachment/bond between the gypsum and the mat. In this construction the flow of gypsum into the mat during preparation of the board is unimpeded. Since the mat is completely porous, the gypsum flows freely into the pores (interstices) of the mat forming a strong bond with the mat.

The strength of the bond between the gypsum core and the fibrous facing is a critical factor in the usefulness of the panel in applications that require the attachment of tiles, insulating material (foam insulation) or other exterior finishing materials onto the fibrous surface. If the bond does not have a sufficient strength, the board is not strong enough to satisfy its supporting function. In that instance, the face sheet delaminates from the gypsum core. Experience has shown that the bond must have a tensile strength of at least about 16 psi, measured by the bond strength test described in detail below, in order to adequately provide the required supporting function.

Extensive outdoor testing has shown that glass mat-faced, water-resistant gypsum board of the type described in the aforementioned '496 patent has much better weathering characteristics, including water-resistant characteristics, than water-resistant gypsum board covered with water-resistant paper facings.

In a more recent improvement of this technology, as described in U.S. Pat. No. 5,397,631, the fibrous mat-faced gypsum board following initial board preparation is coated with a latex polymer. The coating, which is applied onto the fibrous facing of the gypsum panel after the board has been prepared, acts as both a liquid and vapor barrier (vapor permeance of about 1.2 perms (ASTM E-96)).

The coating is formed from an aqueous coating composition comprising from about 15 to about 35 wt. % of resin solids, about 20 to about 65 wt. % of filler, and about 15 to about 45 wt. % of water, applied to obtain a solids loading of at least about 50 lbs. per 1000 sq. ft, such as about 110 lbs. per 1000 sq. ft. A preferred resin for use according to this patent is a latex polymer that has been sold by Unocal Chemicals Division of Unocal Corporation under the mark 76 RES 1018. The resin is a styrene-acrylic copolymer that has a relatively low film-forming temperature.

In accordance with the teachings of the '631 patent, the aqueous coatings composition formed from the resin is not applied to the fibrous mat-facing of the gypsum board until after the board has been prepared. The post-applied coating is dried effectively at oven temperatures within the range of about 300° to 400° F. If desired, a coalescing agent can be used to lower the film-forming temperature of the resin. Since the bond between the fibrous mat and board core is formed during board preparation, the post-applied coating does not affect the strength of that bond and the board is able to satisfy it supporting function just as do the boards of the '496 patent.

More recently, a coated fibrous mat-faced gypsum board of surprisingly effective moisture resistance, having a predominantly inorganic coating on the mat, was developed, see U.S. Published Application 2002/0155282, which is incorporated herein by reference. The mat used to prepare the gypsum board described in this published application was pre-coated with a predominately inorganic coating containing a minor amount of an organic binder and the pre-coated fibrous mat then was used as one of the facers in the manufacture of a gypsum board. Surprisingly, the coating on the pre-coated mat had sufficient porosity to allow water vapor to permeate through the mat during manufacture of the board, but provided the board with unexpectedly effective moisture resistance.

Using a pre-coated mat to manufacture the board significantly simplified the manufacture of the board. The coating was comprised of a mineral pigment (pigmented filler material), an inorganic binder and a latex polymer binder. In particular, the coating comprised a dried (or cured) aqueous mixture of a mineral pigment; a first binder of a polymer latex (organic) adhesive and, a second binder of an inorganic adhesive. On a dry weight basis, the first polymer latex binder comprised no more than about 5.0% by weight of the coating, and the second inorganic binder comprised at least about 0.5% by weight, of the total weight of the coating.

Because the board described in this published application was designed to be used in situations where the surface of the board is not required to support the attachment of tiles, insulating material or other construction materials, e.g., exterior finishing materials, the strength of the bond between the pre-coated mat and the gypsum core was of limited importance. Indeed, the board of this published application has not been used in such situations and the bond between the pre-coated mat and the gypsum core in the disclosed board would not inherently have the necessary tensile strength for such uses.

A manufacturer of a pre-coated mat of the type used in making the gypsum board of the U.S. Published Application 2002/0155282 recently published its own application, U.S. Published Application 2003/0134079 directed to producing an improved coated glass mat using substantially the same coating formulation. The '079 published application is directed principally to an improved procedure for making a coated mat purportedly having improved tensile (tear) properties. The '079 application suggests using the pre-coated mat for making a gypsum panel product and speculates about mat characteristics desirable for that specific application.

In particular, the '079 published application speculates that there is a fine balance between the portion of coated mat and portion of uncoated, exposed glass fibers in the mat needed to make the pre-coated mat suitable for making a gypsum panel product. As described, if too much glass mat is exposed such that the gypsum cannot cover it entirely, the application speculates that the resultant board is unacceptable. Conversely, if not enough glass fibers are left exposed, the '079 application indicates that the resulting board also is not acceptable. In both cases, the '079 application speculates the board may fail a flexural stress test.

The '079 application goes on to suggest that a proper balance is obtained when the coating penetrates into the glass mat substrate to a depth of from 25 percent to 75 percent of the thickness of the coated glass mat. The '079 application does not address the situation where the gypsum board in intended to be used in circumstances where it is required to support a substrate such as tiles, insulating material or other exterior finishing materials.

The present inventors have determined that the coating parameters postulated by the applicants of the '079 application are not suitable for producing a gypsum panel, using current commercial manufacturing techniques, that can be used in situations where tiles, insulating material or other exterior finishing materials must be supported by the panel. In particular, unless the extent of coating penetration in the pre-coated mat is controlled within a much smaller window and the process conditions for subsequently making the gypsum board are properly observed, the resulting bond between the pre-coated glass mat and the gypsum core does not have the required tensile strength for supporting tiles, insulating material or other construction materials, such as exterior finishing materials.

BRIEF DESCRIPTION OF THE DRAWINGS

The objects, features, and advantages of the invention will be apparent from the following more detailed description of certain embodiments of the invention and as illustrated in the accompanying drawings. The drawings are highly schematic and are not necessarily to scale, emphasis instead being placed upon illustrating the features of the invention.

DETAILED DESCRIPTION OF THE INVENTION

Figure 1:
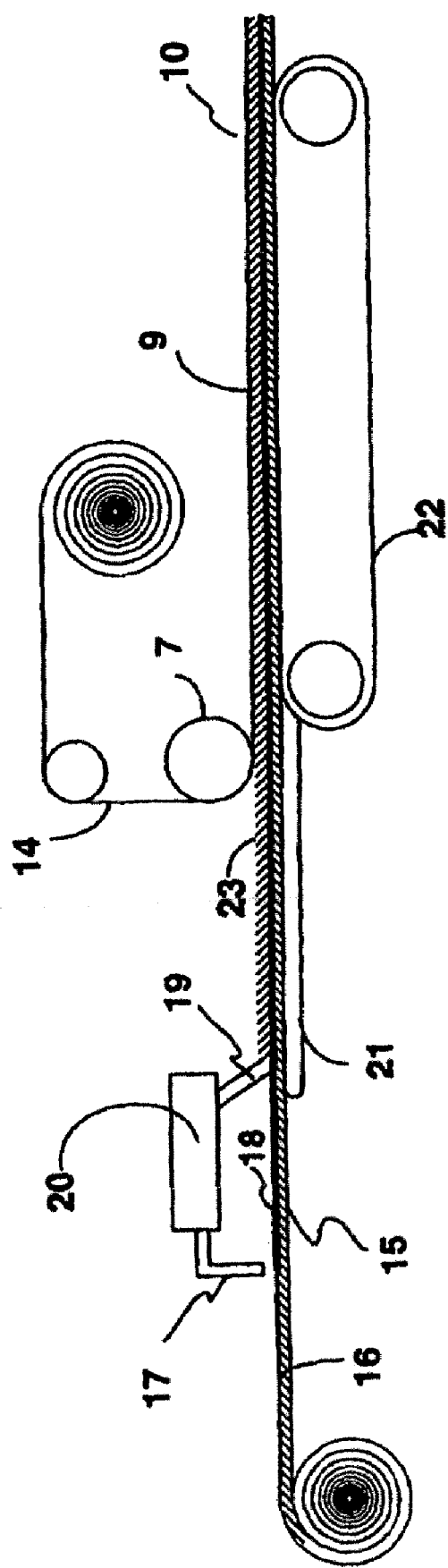
FIG. 1, shows a highly schematic view of an apparatus for making the gypsum board of the present invention and the board being assembled thereon.

As shown in FIG. 1, a gypsum board of the present invention (10) can be manufactured by enmeshing a set gypsum board core formed from a gypsum slurry (23) with at least one, and preferably two pre-coated fiber mats, (14) and (16). Preferably, both mats are predominately glass fiber mats. The surface of at least one of the mats (and preferably both of the mats) has been pre-coated with a dried (heat cured) coating (indicated by the numeral (15) in the figures) of an aqueous coating composition containing a combination (e.g., a mixture) of a mineral pigment or filler; an organic binder, preferably a UV resistant polymer latex adhesive binder having a suitable level of hydrophobicity (a hydrophobic, UV resistant polymer latex) and, optionally a second binder of an inorganic adhesive. By "pre-coated" is meant that the mat has a dried, adherent coating of what was originally an aqueous coating composition, as hereinafter defined in more detail, applied to its surface before the mat is used to make the gypsum board of the present invention.

The fiber mat(s) comprise(s) a fiber material that is capable of forming a strong bond with the set gypsum comprising the core of the gypsum board through a mechanical-like interlocking between the interstices (pores) of the fiber mat and portions of the gypsum core filling those interstices. Examples of such fiber materials include (i) a mineral-type material such as glass fibers, (ii) synthetic resin fibers and (iii)

mixtures or blends thereof. Based on economic considerations, glass fiber mats are preferred for making the pre-coated mat.

The fiber mats can comprise continuous or discrete strands or fibers and can be woven or nonwoven in form. Nonwoven mats such as made from chopped strands and continuous strands can be used satisfactorily and are less costly than woven materials. The strands of such mats typically are bonded together to form a unitary structure by a suitable adhesive.

Non-woven glass mat suitable for use in the present invention can be prepared by a wet-laid process, which is carried out on what can be viewed as modified papermaking machinery. Descriptions of the wet-laid process for making glass mats may be found in a number of U.S. patents, including U.S. Pat. Nos. 2,906,660, 3,012,929, 3,050,427, 3,103,461, 3,228,825, 3,760,458, 3,766,003, 3,838,995, 3,905,067, 4,112,174, 4,681,802 and 4,810,576, all of which are incorporated herein by reference.

In general, the wet-laid process for making non-woven glass fiber mats comprises first forming an aqueous slurry of short-length glass fibers (referred to in the art as "white water") under agitation in a mixing tank, then feeding the slurry onto a moving screen on which the fibers enmesh themselves into a freshly prepared wet glass fiber mat, while excess water is separated from the mat of fibers. Most, if not all of the fibers used to make the mat have a length somewhere between about one-quarter (¼) to about one (1) inch, and more usually from about one-quarter (¼) to about three-quarter (¾) inch and have diameters in the range of 10 to 16 microns.

Machines such as wire cylinders, Fourdrinier machines, Stevens Former, Roto Former, Inver Former and Venti Former machines and the like can be used to form the wet-laid mat. In such equipment, a head box deposits the dilute slurry onto a moving wire screen. Suction or vacuum removes the water resulting in the wet-laid mat. Usually, an upwardly inclined wire having several linear feet of very dilute stock lay-down, followed by several linear feet of high vacuum water removal, is used. This is followed by a binder applicator, such as a "curtain coater," that applies the glass fiber binder and then by an oven that removes excess water and cures (dries) the adhesive to form a coherent fiber mat structure.

Fiber mats made in this way have an open pore structure with a high percentage of fiber-fiber interstitial space.

Fiber mats are commonly made in widths anywhere from 144 to 240 inches and collected in roll form for storage and handling, e.g., transportation. For use in making gypsum boards, rolls of fiber mats having a width between about 23 and 57 inches typically are desired and can be obtained in those widths directly from the mat manufacturing process or can be cut from rolls of greater widths.

Figure 2:
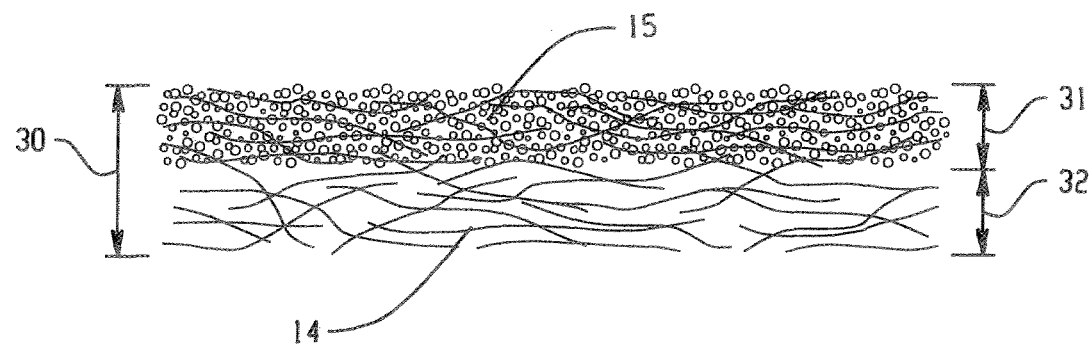
FIG. 2 is a highly schematic cross-sectional view of a section of a pre-coated mat suitable for making a gypsum board according to the present invention.

With reference to FIG. 2, a suitable fiber mat for use in the present invention can range in thickness (30), for example, from about 20 to about 45 mils, with a mat thickness (30) of about 25 mils to about 35 mils generally being preferred.

Fiber mats meeting these requirements are known and are commercially available. In many cases the thickness (30) of a specific fiber mat will be variable across its structure, possibly both in the machine (i.e., manufacturing) direction, i.e., along its length or major dimension, and across its width or minor dimension (cross-machine direction).

In addition to the fiber diameter, fiber length and mat thickness, the weight per unit surface area at which the non-woven glass fiber mat is prepared also influences the properties of the mat important for making a pre-coated mat suitable for use in making a gypsum wallboard by the continuous gypsum board production method. Broadly the mat should be prepared at a weight per unit surface area (hereinafter also referred to as the basis weight) of from about 1 lb./100 ft.$^2$ to no greater than about 3 lb./100 ft$^2$. More specifically, it is preferred that the fiber mat, especially a non-woven glass fiber mat, be prepared at a basis weight of at least about 1.4 lb./100 ft.$^2$ but no greater than about 2.7 lb./100 ft$^2$ (measured at an uncompressed mat thickness (30) in the range of about 20 mils to about 45 mils), with a nominal thickness of about 33 mils being the most typical.

A suitable fiber mat for making the pre-coated mat used in the present invention is a fiberglass mat comprising chopped, nonwoven, fiberglass filaments oriented in a random pattern and bound together with a resin binder, usually a urea-formaldehyde resin adhesive. Fiber glass mats of this type are commercially available, for example, such as those which have been sold under the trademark DURA-GLASS® by Manville Building Materials Corporation and those which have been sold by Elk Corporation as BUR or shingle mat.

One glass fiber mat, which is particularly useful for preparing a pre-coated mat for making a gypsum board of the present invention, is nominally 0.030 to 0.033 inch (30 mils to 33 mils)(0.76 to 0.83 mm) thick and incorporates glass fibers about 13 to 16 microns in diameter. Another glass fiber mat nominally 20 mils thick, which includes glass fibers about 10 microns in diameter, is also suitable for use in the present invention. Manville mat JM 7594 is one suitable fiber mat and has a thickness generally within the range of 0.030 to 0.042 inch (30 to 42 mils).

A coated glass mat suitable for use in preparing the gypsum board of the present invention has a coating (15) applied from an aqueous coating formulation to the thus-prepared fiber mat, which coating has substantially uniformly penetrated the open-pore structure of the mat. In accordance with the present invention, the coating is applied such that it penetrates into and envelopes the fibers of the glass fiber mat to a depth of from about 30 percent to about 50 percent of the thickness (30) of the coated glass fiber mat. With reference to FIG. 2, the coating depth of mat penetration (31) is from about 30 percent to about 50 percent of the total mat thickness (30), preferably from about 35 to 50 percent. With this degree of coating penetration, the un-coated mat portion (32) comprises about 50 percent to about 70 percent (more preferably 50 to 65 percent) of the total mat thickness (30). This portion (32) is available for penetration by gypsum slurry during preparation of a gypsum board.

The applied coating has a morphology characterized by a film covering and to a certain extent bridging individual fibers in the mat accompanied by a distribution of micropores (not shown) through the film coating (15). The distribution of micropores in the coating (15) is sufficient to allow air-flow there through during board manufacture thus allowing for the gypsum slurry to fill the fiber-fiber interstices of the non-coated side (32) of the mat during the initial stages in the preparation of the gypsum board and to allow a sufficient curing and drying of the gypsum core during the completion of the manufacture of the board. In other words, the coating is sufficiently porous to permit the gypsum slurry to displace air through the mat during the first phase of board preparation and to permit water in the aqueous gypsum slurry from which the gypsum core is made to evaporate in its vaporous state there through during the final manufacturing steps of the board. The morphology and composition of the coating nonetheless acts as a barrier to the influx of moisture during subsequent use of the board.

The extent of penetration and the related morphology of the coating on the mat should be relatively uniform across the entire surface of the mat. As used in the specification and claims, the phrase "relatively uniform" means that the extent of coating penetration and other coating morphological parameters, such as coating density and porosity (microporosity), as hereinafter defined, should remain within a desired range over 50 percent of the surface area of the mat, preferably over 75 percent of the surface of the mat and most preferably over 90 percent of the surface of the mat. Preferably, the extent of penetration and other coating morphological parameters also do not vary by more than 50 percent over the surface area of the mat, preferably do not vary by more than 30 percent and most preferably do not vary by more than 20 percent across the mat surface area.

The coating composition, which is applied to one, free surface of the above-described fiber mat for making the pre-coated mat for use in the present invention, comprises an aqueous combination of predominately a mineral pigment or filler; an organic adhesive binder, preferably a hydrophobic, UV resistant polymer latex adhesive; and, optionally a second inorganic binder of an inorganic adhesive. On a dry weight basis of the two essential components (100%), the organic binder comprises at least about 1% and no more than about 17% by weight, with the balance being the inorganic, mineral pigment or filler. Optionally a second inorganic binder preferably comprising at least about 0.5% by weight, of the total weight of the dried (cured) coating, but no more than about 20% by weight of the coating also can be present. The weight ratio of the mineral pigment or filler to the polymer latex adhesive (organic) binder can be in excess of 15:1 and in some cases can be in excess of 20:1, but usually is at least about 5:1.

Suitable coating compositions for making the pre-coated mat useful in the present invention thus may contain, on a dry weight basis of the three noted components (100%), about 75 to 99 percent mineral pigment or filler, more usually about 83 to 95 percent mineral pigment or filler, about 0 to 20 percent inorganic adhesive, more usually about 0 to 10 percent and about 1 to 17 percent organic adhesive binder, preferably a hydrophobic, UV resistant polymer latex adhesive, more usually about 1 to 12 percent.

A mineral pigment or filler comprises the major component of the coating composition. Examples of mineral pigments suitable for making coated mats useful in the present invention include, but are not limited to, ground limestone (calcium carbonate), clay, sand, mica, talc, gypsum (calcium sulfate dihydrate), aluminum trihydrate (ATH), antimony oxide, or a combination of any two or more of these substances.

The mineral pigment is provided in a particulate form. To be an effective mineral pigment for making a coated mat for use in this invention, the pigment should have a particle size such that at least about 95% by weight of the pigment particles pass through a 100 mesh wire screen, with about 75% of the particles (by number) being greater that 5 μm. Preferably, the pigment has most of, if not all of, the fine particles removed, especially particles less than 1 μm. It has been observed that the presence of an excess amount of fine particles in the coating composition negatively impacts the porosity (microporosity or micropore structure) of the pre-coated mat. A preferred mineral pigment is a limestone having a number average particle size of about 40 μm. Such materials are collectively and individually referred to in the alternative as mineral pigments or as "fillers" throughout the remainder of this application.

The second essential constituent, the organic adhesive binder includes such materials as styrene-butadiene-rubber (SBR), styrene-butadiene-styrene (SBS), ethylene-vinyl-chloride (EVCl), poly-vinylidene-chloride (PVdC), modified poly-vinyl-chloride (PVC), poly-vinyl-alcohol (PVOH), ethylene-vinyl-actate (EVA), and poly-vinyl-acetate (PVA). Preferably, the organic binder is a hydrophobic, UV resistant, polymer latex binder adhesive, including polymers and copolymers containing units of acrylic acid, methacrylic acid (together referred to as (meth)acrylic acids)), their esters (referred to together as ((meth)acrylates) or acrylonitrile.

Ordinarily these latexes of UV resistant polymers are made by emulsion polymerization of ethylenically unsaturated monomers. Such monomers may include (meth)acrylic acid, 2-hydroxyethyl(meth)acrylate, 2-hydroxypropyl(meth)acrylate, 2-hydroxybutyl(meth)acrylate, methyl(meth)acrylate, ethyl(meth)acrylate, propyl(meth)acrylate, isopropyl(meth)acrylate, butyl(meth)acrylate, amyl(meth)acrylate, isobutyl (meth)acrylate, t-butyl(meth)acrylate, pentyl(meth)acrylate, isoamyl(meth)acrylate, hexyl(meth)acrylate, heptyl(meth)acrylate, octyl(meth)acrylate, isooctyl(meth)acrylate, 2-ethylhexyl(meth)acrylate, nonyl(meth)acrylate, decyl(meth)acrylate, isodecyl(meth)acrylate, undecyl(meth)acrylate, dodecyl(meth)acrylate, lauryl(meth)acrylate, octadecyl (meth)acrylate, stearyl(meth)acrylate, tetrahydrofurfuryl (meth)acrylate, butoxyethyl(meth)acrylate, ethoxydiethylene glycol (meth)acrylate, benzyl(meth)acrylate, cyclohexyl (meth)acrylate, phenoxyethyl(meth)acrylate, polyethylene glycol mono(meth)acrylate, polypropylene glycol mono (meth)acrylate, methoxyethylene glycol (meth)acrylate, ethoxyethoxyethyl(meth)acrylate, methoxypolyethylene glycol (meth)acrylate, methoxypolypropylene glycol (meth) acrylate, dicyclopentadiene(meth)acrylate, dicyclopentanyl (meth)acrylate, tricyclodecanyl(meth)acrylate, isobornyl (meth)acrylate, and bornyl(meth)acrylate. Other monomers which can be co-polymerized with the (meth)acrylic monomers, generally in a minor amount, include styrene, diacetone (meth)acrylamide, isobutoxymethyl(meth)acrylamide, N-vinylpyrrolidone, N-vinylcaprolactam, N,N-dimethyl(meth) acrylamide, t-octyl(meth)acrylamide, N,N-diethyl(meth) acrylamide, N,N'-dimethyl-aminopropyl(meth)acrylamide, (meth)acryloylmorphorine; vinyl ethers such as hydroxybutyl vinyl ether, lauryl vinyl ether, cetyl vinyl ether, and 2-ethylhexyl vinyl ether; maleic acid esters; fumaric acid esters; and similar compounds.

Suitable hydrophobic, UV resistant polymer latex binder adhesives are preferably based on a (meth)acrylate polymer latex, wherein the (meth)acrylate polymer is a lower alkyl ester, such as a methyl, ethyl or butyl ester, of acrylic and/or methacrylic acids, and copolymers of such esters with minor amounts of other ethylenically unsaturated copolymerizable monomers (such as styrene) which are known to the art to be suitable in the preparation of UV resistant (meth)acrylic polymer latexes. Another suitable co-monomer is vinyl acetate, which may be used as a co-monomer with, for instance, butyl acrylate in a ratio of 70/30 or smaller of the vinyl acetate to the butyl acrylate.

One particularly useful hydrophobic, UV resistant polymer latex binder adhesive is NeoCar® Acrylic 820. NeoCar® Acrylic 820 is an ultra-small particle size, hydrophobic latex available from Dow Chemical Company and is apparently made by copolymerizing a highly branched vinyl ester with an acrylate. Other suitable hydrophobic, UV resistant polymer latex binder adhesives include Glascol® C37 and Glascol® C44 available from Ciba Specialties Chemical Corporation; Rhoplex® AC-1034 available from Rohm & Haas and UCAR® 626 available from Dow Chemical Company.

As used throughout this specification and in the claims, the terms hydrophobic, hydrophobicity and the like are intended to embrace UV resistant polymers, which yield a three (3) minute Cobb value of below about 1.5 grams for the pre-coated fibrous mat. UV resistant polymers that exhibit a three (3) minute Cobb value of below about 0.5 grams are particularly preferred for making the pre-coated fibrous mat. The three minute Cobb value of a resin is determined by a simple procedure which is similar to TAPPI procedure T441. According to the procedure, a coated test mat is prepared by coating a standard glass mat with an aqueous coating formulation and dried at 230° F. (110° C.) for 20 minutes. The coating formulation is prepared by combining 70 parts by weight limestone having an average particle size of about 40 μm (GFP 102 available from Global Stone Filler Products or equivalent) with 17 parts by weight (dry solids basis) of the latex resin and blending thoroughly for 30 seconds. The aqueous formulation is applied to the mat using a simple knife applicator to obtain a dry basis weight of between about 22 grams of coating per sq. ft. on the glass mat (standard glass mat—Johns Manville mat 7594 or equivalent).

A 5.25 inches by 5.25 inches square sample of the coated mat is obtained, weighed and then secured in a 100 $cm^2$ Cobb ring. One hundred milliliters of warm (120° F. (49° C.)) water is poured into the ring as rapidly as possible and retained there for 2 minutes and 50 seconds. Then, the water is poured from the ring as quickly as possible (without contacting any other portion of the sample). At the three minute mark, a Couch roller is used with a sheet of blotting paper (rolled forward and backwards once) to remove excess moisture from the sample. The sample then is weighed and the increase in weight is recorded. The test is repeated once and the average of the two weight increase values is considered the three minute Cobb value for that sample. Again, UV resistant latex resins exhibiting a three minute Cobb value of 1.5 gms or below in this test are preferred for use in the present invention.

An optional component of the coating composition is an inorganic adhesive binder. Examples of inorganic adhesive binders which can be used in combination with the polymer adhesive latex binder(s) in the coating composition for making a pre-coated fibrous mat useful in this invention include, but are not limited to the following: calcium oxide, calcium silicate, calcium sulfate (anhydrous or hemi-hydrate), magnesium oxychloride, magnesium oxysulfate, and other complex inorganic binders of some Group IIA elements (alkaline earth metals), as well as aluminum hydroxide.

One example of a complex inorganic binder is common Portland cement, which is a mixture of various calcium-aluminum silicates. However, Portland cement cures by hydration, which can create a coating mixture with a short shelf life. Also, both the oxychloride and the oxysulfate of magnesium are complex inorganic binders, which cure by hydration. Coating formulations made with such inorganic adhesive binders must be used quickly or a tank containing the aqueous coating composition could set up in a short period of time.

The oxychlorides or oxysulfates of magnesium, aluminum hydroxide, and calcium silicate are only very slightly soluble in water, and are useful optional inorganic adhesive binders of this invention. Inorganic adhesive binders, which are quickly soluble in water, such as sodium silicate, may not be usable in coatings expected to be exposed to hot and/or high humid ambient conditions for long periods. One preferred inorganic adhesive binder for making a coated mat useful in this invention is quicklime (CaO). Quicklime does not hydrate in a coating mix, but cures by slowly converting to limestone, using carbon dioxide from the air. Quicklime is not (or only very sparingly) soluble in water.

Inorganic pigment or filler materials inherently containing some naturally occurring inorganic adhesive binder also can be used to make, and often are preferred for making the coated mat used in the present invention. Examples of such fillers, some listed with the naturally occurring binder, include (but are not limited to) the following: limestone containing quicklime (CaO), clay containing calcium silicate, sand containing calcium silicate, aluminum trihydrate containing aluminum hydroxide, cementitious fly ash and magnesium oxide containing either the sulfate or chloride of magnesium, or both. Depending on its level of hydration, gypsum can be both a mineral pigment and an inorganic adhesive binder, but it is only slightly soluble in water, and the solid form is crystalline making it brittle and weak as a binder. As a result, gypsum is not generally preferred for use as the optional inorganic adhesive binder.

Fillers, which inherently include an inorganic adhesive binder as a constituent and which cure by hydration, also advantageously act as flame suppressants. As examples, aluminum trihydrate (ATH), calcium sulfate (gypsum), and the oxychloride and oxysulfate of magnesium all carry molecules of water bound into their molecular structure. This water, referred to either as water of crystallization or water of hydration, is released upon sufficient heating, actually suppressing flames.

Low cost inorganic mineral pigments and fillers such with the properties of those described in the preceding paragraph, thus, may provide three (3) important contributions to the coating mixture: filler; a binder; and, a fire suppressor.

In addition to the two essential components and the one optional component, the aqueous coating composition will also include water. Water is provided in an amount sufficient to provide desired theological properties (e.g., viscosity) to the aqueous coating composition. Desired rhelogical properties are those which, given the chosen form of application of the aqueous coating composition to the fiber mat, provide for the retention of the coating formulation on the surface of the fibers of the fiber mat and within the interstices of the fiber mat to a depth between 30 and 50 percent of the thickness of the fiber mat from a free surface of the mat and the formation of the desired coating morphology (microporosity). The aqueous coating composition will usually also include other optional ingredients such as colorants (e.g., pigments), thickeners or theological control agents, defoamers, dispersants and preservatives. When used, the aggregate amount such other ingredients in the coating composition is typically in the range of 0.1 to 5% and generally is not more than about 2% of the principal three above-noted components. Generally, the aqueous coating formulation will have a viscosity between about 8,000 and 18,000 cps.

Any suitable method for applying an aqueous coating composition to the fiber mat substrate can be used for making the pre-coated mat, such as roller coating, curtain coating, knife coating, brush coating, spray coating and the like, including combinations thereof, provided that the depth of coating is limited to within the range of 30 to 50 percent of the mat thickness.

Following application of the aqueous coating composition to the mat, the composition is dried (cured), typically in a drying oven, to form the pre-coated mat. The mat is dried at a temperature and for a time sufficient to remove the water from the coating composition and coalesce the organic polymer adhesive to form an adherent coating, without degrading the coating or the mat. Suitable temperatures and times will be influenced greatly by the equipment being used and can be obtained by those skilled in the art using routine experimentation.

As will be appreciated by those skilled in the art, the extent to which the aqueous coating formulation penetrates into the fiber mat is influenced on the one hand by the properties of the fiber mat itself and on the other hand by the various coating parameters such as the aqueous coating viscosity, the time between applying the coating and drying (curing) the coating (e.g., the speed of the coating line), the rate of application of the coating, the method by which the coating is applied and the like. Varying these parameters to obtain the desired extent of penetration in any particular mat requires no more than routine experimentation to those skilled in the art.

The pre-coated mat made in accordance with these teachings is effectively liquid impermeable, but does allow air and water vapor to pass through, sufficiently to be used in making a gypsum board by the continuous gypsum board manufacturing process.

The pre-coated fiber mat used in the preparing the gypsum board of the present invention can be prepared by applying an aqueous coating composition containing the noted solid constituents to a fiber mat, as identified above, in an amount on a dry weight basis equivalent to at least about 30 lbs., more usually between about 30 and 100 lbs., per 1000 sq. ft. of mat. Normally, the dry coating is present in an amount equivalent to at least about 30 to 50 lbs. depending upon the thickness of the glass fiber mat.

Previous work has shown that certain UV resistant latex resins of the desired hydrophobicity are useful for making a pre-coated fiber mat useful in ultimately making an improved gypsum panel particularly useful for exterior applications (pending U.S. application Ser. No. 10/417,344). The earlier work also indicated that mats coated with compositions made using such hydrophobic, UV resistant latex resins (polymers), within certain compositional constraints, were sufficiently porous to be used for making a gypsum board using conventional manufacturing procedures. Unfortunately, this prior work did not recognize the relationship between pre-coated mat properties, such as coating morphology and coating depth, and the strength of the facer-board bond which determines the ability of the board to adequately support tiles, insulating material or other construction materials, such as exterior finishing materials from the pre-coated mat surface of the board.

Thus, the organic binder must provide, in combination with the mineral pigment or filler and the optional inorganic adhesive, when dried to form the adherent coating a desired level of porosity (microporosity or micropore structure) at the noted usage levels and coating density. The coating porosity is determined by an easily performed test, which is described in detail below. Organic binders failing to meet the porosity (microporosity) requirement are not suitable for use in the coating composition of the present invention for making the pre-coated fibrous mat.

The test for porosity (microporosity) is a modification of the procedure of TAPPI T460, Gurley method for measuring the air resistance of paper. In this procedure, a sample of the coated mat (approximately 2 inches by 5 inches) is clamped between the 1 in$^2$ orifice plates of a Gurley Densometer, Model 4110. The inner cylinder is released and allowed to descend under only its own weight (i.e. by gravity alone) and the elapsed time (measured in seconds) between the instant the inner cylinder enters the outer cylinder of the apparatus until the 100 ml mark on the inner cylinder reaches (enters) the outer cylinder is recorded. The test then is repeated with the sample facing (oriented) in the opposite direction. The porosity, reported in seconds, comprises the average of the two replicates for each sample. A suitable resin exhibits a porosity of less than about 45 seconds, preferably less than about 20 seconds. At porosities of higher than about 45 seconds, the coated mat-gypsum core interface is at a much higher risk of delamination (i.e., blister formation) as the water vapors seek a path to escape during curing of the board. As discussed below, too low of a porosity also interferes with air flow through the coating during board preparation as the gypsum slurry seeks to penetrate into and through the non-coated side of the mat and leads to formation of an unsatisfactory interface between the gypsum core and the coating. Preferably, the porosity is also more than about 2 seconds and usually more than about 5 seconds, so as to minimize bleedthrough of gypsum during board manufacture.

Gypsum boards made with the pre-coated fibrous mat of the present invention have superior weathering characteristics, and accordingly, can be used effectively for indefinite periods of time as a stable substrate in outdoor applications involving extended exposure to the sun, prolonged water contact and high humidity.

The gypsum core of the gypsum board of the present invention is basically of the type used in those gypsum structural products, which are known as gypsum wallboard, dry wall, gypsum board, gypsum lath and gypsum sheathing. The core of such a product is formed by mixing water with powdered anhydrous calcium sulfate or calcium sulfate hemi-hydrate ($CaSO_4.1/2H_2O$), also known as calcined gypsum to form an aqueous gypsum slurry, and thereafter allowing the slurry mixture to hydrate or set into calcium sulfate dihydrate ($CaSO_4.2H_2O$), a relatively hard material.

The composition from which the set gypsum core of the structural panel is made can include a variety of optional additives, including, for example, those included conventionally in gypsum wallboard. Examples of such additives include set accelerators, set retarders, foaming agents, reinforcing fibers (e.g., glass fibers), and dispersing agents.

A preferred gypsum core of the present invention also includes one or more additives, which improve the water-resistant properties of the core. In particular, the coated fibrous mat-faced gypsum board for use in the present invention preferably comprises a gypsum core, which has water-resistant properties. The preferred means for imparting water-resistant properties to the gypsum core is to include in the gypsum composition from which the core is made one or more additives, which improve the ability of the set gypsum composition to resist being degraded by water, for example, to resist dissolution.

Examples of materials which have been reported as being effective for improving the water-resistant properties of gypsum products are: poly(vinyl alcohol), with or without a minor amount of poly(vinyl acetate); metallic resinates; wax or asphalt or mixtures thereof, usually supplied as an emulsion; a mixture of wax and/or asphalt and also cornflower and potassium permanganate; water insoluble thermoplastic organic materials such as petroleum and natural asphalt, coal tar, and thermoplastic synthetic resins such as poly(vinyl acetate), poly(vinyl chloride) and a copolymer of vinyl acetate and vinyl chloride and acrylic resins; a mixture of metal rosin soap, a water soluble alkaline earth metal salt, and residual fuel oil; a mixture of petroleum wax in the form of an emulsion and either residual fuel oil, pine tar or coal tar; a mixture comprising residual fuel oil and rosin; aromatic isocyanates and diisocyanates; organopolysiloxanes, for example, of the type referred to in U.S. Pat. Nos. 3,455,710; 3,623,895; 4,136,687; 4,447,498; and 4,643,771; siliconates, such as available from Dow Corning as Dow Corning 772; a wax emulsion and a wax-asphalt emulsion each with or without such materials as potassium sulfate, alkali and alkaline earth aluminates, and Portland cement; a wax-asphalt emulsion prepared by adding to a blend of molten wax and asphalt an oil-soluble, water-dispersing emulsifying agent, and admixing the aforementioned with a solution of case in which contains, as a dispersing agent, an alkali sulfonate of a polyarylmethylene condensation product. Mixtures of these additives can also be employed.

A mixture of materials, namely, one or more of poly(vinyl alcohol), siliconates, wax emulsion and wax-asphalt emulsion of the aforementioned types, for example, also can be used to improve the water resistance of gypsum products, such as described in aforementioned U.S. Pat. No. 3,935,021, which is incorporated herein in its entirety.

Typically, the core of fibrous mat-faced gypsum board has a density of about 40 to about 55 lbs. per cu. ft., more usually about 46 to about 50 lbs per cu. ft. Of course, cores having both higher and lower densities can be used in particular applications if desired. The manufacture of cores of predetermined densities can be accomplished by using known techniques, for example, by introducing an appropriate amount of foam (soap) into the aqueous gypsum slurry from which the core is formed or by molding.

The pre-coated fiber mat-faced gypsum board can be made efficiently, as is well known, by forming an aqueous gypsum slurry which contains excess water and placing the gypsum slurry on a horizontally oriented moving web of the pre-coated fiber mat, with the coated mat surface oriented away from the deposited gypsum slurry. In a preferred embodiment, another moving web of fiber mat, which optionally can also be the pre-coated fiber mat, but for example also can be a glass mat, a mat made from a blend of glass and synthetic fibers, or a pre-treated mat, is then placed on the upper free surface of the aqueous gypsum slurry. Aided by heating, excess water evaporates through the pre-coated mat as the calcined gypsum hydrates and sets.

In order for the pre-coated mat to be most useful in making the coated mat-faced gypsum board of the present invention, it is preferred that the coated mat be rolled into rolls of continuous sheet. As a result, the coated mat cannot be so stiff and brittle that it will break upon bending. To accomplish this objective, it appears that the inorganic adhesive binder content of the mat coating, when present in a formulation, should not exceed about 20% by weight of the total dry weight of the coating, and usually is less than about 10%. As noted, such rolls are typically employed in widths between 23 and 57 inches.

The moisture tolerant structural panels of this invention comprising a pre-coated fibrous mat-faced gypsum board can be made utilizing an existing, manufacturing line for gypsum wallboard as illustrated in FIG. 1. In conventional fashion, dry ingredients from which the gypsum core is formed can be pre-mixed and then fed to a mixer of the type commonly referred to as a pin mixer (20). Water and other liquid constituents, such as soap, used in making the core are metered into the pin mixer where they are combined with the desired dry ingredients to form an aqueous gypsum slurry. Foam (soap) is generally added to the slurry, such as in the pin mixer or in a separate mixer, to control the density of the resulting core.

The gypsum slurry is dispersed through one or more outlets from the mixer onto a moving sheet (fibrous mat) (16), which is indefinite in length and is fed from a roll thereof onto a forming table (21) and advanced by conveyor (22). The sheet (16) includes a coating (15) (see also FIG. 2) on what constitutes the bottom surface of the sheet as fed to the forming table. As described above, the coating comprises a dried aqueous mixture of a mineral pigment; an organic binder preferably comprising a hydrophobic, UV-resistant polymer latex adhesive; and, optionally a second binder comprised of an inorganic adhesive.

Figure 3:
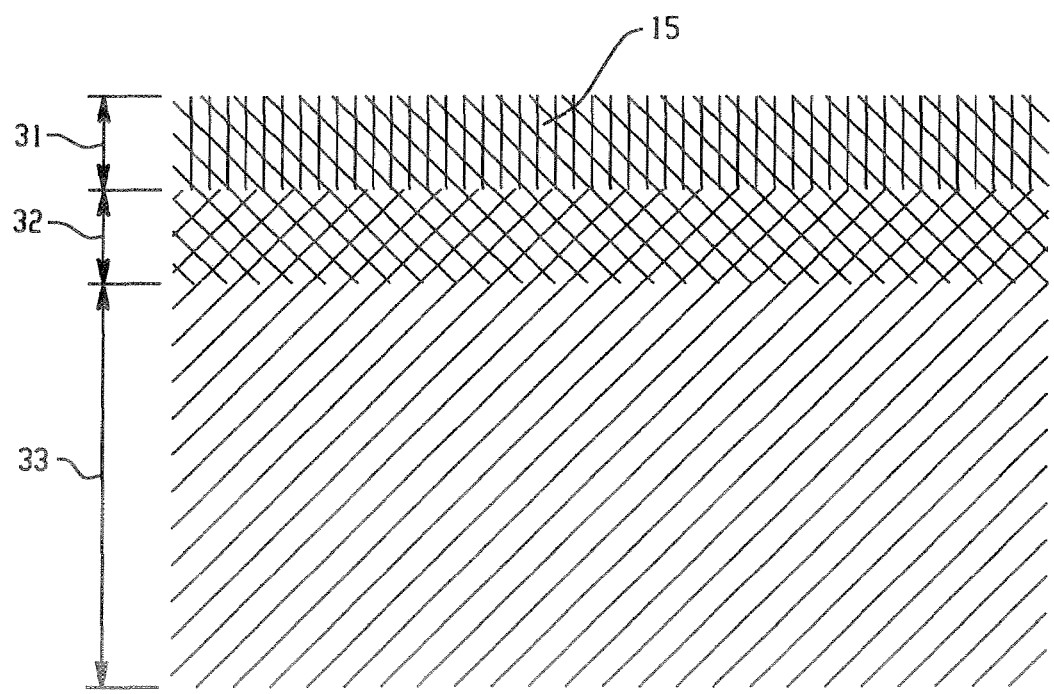
FIG. 3 is a highly schematic cross-sectional view of a section of a gypsum board according to the present invention illustrating the interface of the pre-coated mat and gypsum core.

In order to obtain a bond of a sufficient strength between the uncoated side of the mat and the gypsum core, so as to permit the board to support tiles, insulating material or other construction materials, such as exterior finishing materials from the pre-coated mat surface of the board, it is critical that the gypsum slurry flow into and through the interstices of the mat so as to meet with the internal (inner-most) border of the coating of the coated mat. This construction is schematically shown in FIG. 3. The flow of gypsum slurry into the uncoated side of the pre-coated mat and through to the internal surface of the coating must be so complete as to cause this interface to be substantially free of entrapped air. In other words, the interfacial contact between the gypsum core penetrating the uncoated surface of the mat and the coating must be substantially free of voids.

As shown in FIG. 3, the gypsum board (10) of this invention has basically three regions on the coated mat side of the board: (31), (32) and (33), schematically indicated by different cross-hatching in the figure. Region (31) is the outermost board face and contains the coated portion of the fiber mat facer having the mat coating (15). Region (33) is the gypsum core and contains principally set gypsum and other common gypsum additives. This region is free of the fiber mat facer. Finally, region (32) contains that portion of the fiber mat facer that was free of the coating composition (uncoated mat) but has become imbibed with the gypsum slurry during board preparation and has subsequently set to form set gypsum. As shown, there is substantially complete contact between the mat coating (15) and the set gypsum in the imbibed region (32). Together with the mechanical interlocking with the fiber mat, this continuous interface between the set gypsum core and the mat coating is what contributes to the development of a bond of a sufficient strength between the mat and the gypsum core, so as to permit the coated mat surface of the board to support tiles, insulating material or other construction materials, such as exterior finishing materials from the pre-coated mat surface of the board.

The microporosity of the coating on the fiber mat thus permits the gypsum slurry to displace air through the mat during the initial stage in the preparation of the gypsum board. If the coating on the mat lacks the necessary microporosity, the air in the interstices of the fiber mat is unable to escape and a proper interfacial contact between the penetrating gypsum core and the mat coating is not formed.

Figure 4:
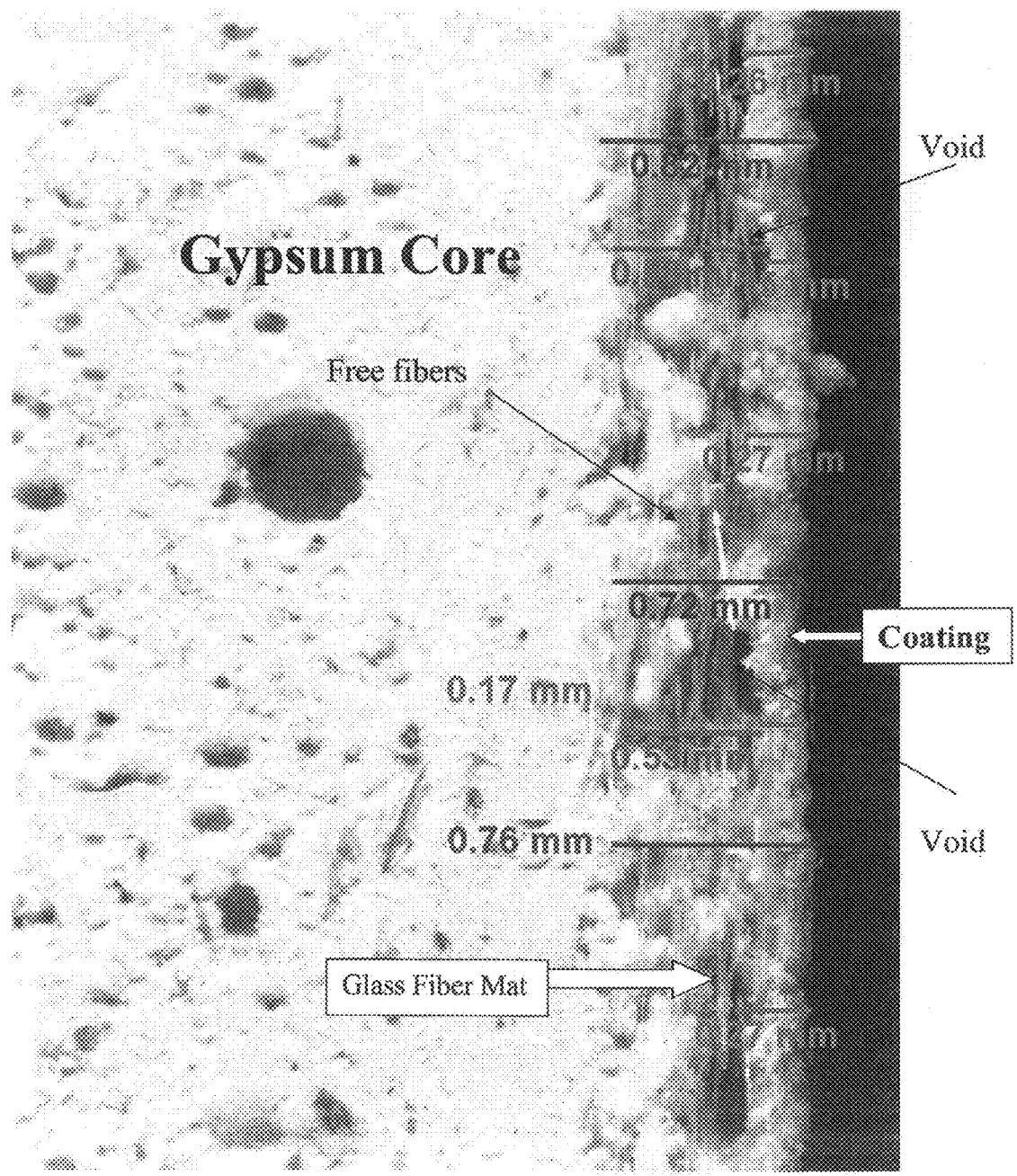
FIG. 4 is a color photomicrograph showing the interface between a coated fiber mat and the gypsum core in a gypsum board.

FIG. 4 illustrates poor gypsum penetration through the interstices of the fiber mat to the inner mat surface of the coating. As shown in FIG. 4, the coating on the glass mat facer has penetrated for the most part to a depth of from about 0.15 to in some instances as much as 0.27 mm (6 to about 11 mils) in a glass mat having a thickness of about 0.76 to 0.82 mm (30 to 32 mils). This constitutes an average penetration depth of about 25 to 27 percent of the thickness of the mat. As a consequence of the insufficient coating penetration and formation of the proper coating morphology, the gypsum slurry was unable to penetrate (flow) into the uncoated side of the mat sufficiently to form continuous interfacial contact between the coating and the set gypsum core. As a result one can see voids in the vicinity of the coating-core interface as well as portions of the glass fiber mat that are not imbibed with set gypsum.

However, the coating on the mat cannot be so porous as to allow gypsum to freely penetrate through the coating and cause gypsum bleed thru onto the face of the product. A preferred coating porosity (microporosity) is between 5 and 20 seconds.

One convenient way to ensure an adequate formation of a substantially continuous interface between the gypsum core and the internal surface of a properly coated fiber mat is to discharged one stream of gypsum slurry through outlet (17) to provide a relatively thin layer of aqueous calcined gypsum slurry (18) on the non-coated surface of sheet 16. The thin layer of gypsum slurry (18) is somewhat more dense than the aqueous slurry of gypsum that is used to form the main portion of the core of the gypsum board (main core slurry discharged through outlet (19) to form gypsum slurry layer (23)). The penetration of this higher density slurry into the interstices of the fiber mat and the elimination of any entrapped air at the gypsum-coating interface can be added by a roller (not shown). The proper penetration of this thin layer of gypsum into the interstices of the fiber mat helps to form the strong bond between the lower density portion of the core and the pre-coated mat facer. Typically, the slurry used to form the thin layer (18) is about 18-20% more dense than the density of the slurry (23) used to form the main portion of the core. A portion of this denser slurry also is often used to form hard edges of the gypsum board as well.

In this illustrative embodiment, pre-coated mat (16) thus forms one of the facing sheets of the gypsum board. As noted above, the pre-coated mat is fed with the coated side facing away from the gypsum slurry. The slurry (preferably denser slurry (18)) penetrates sufficiently into and through the thickness of the pre-coated glass mat, on the back-side, or non-coated side of the mat, to form a bond between the subsequently set gypsum, the fibrous mat and the dried adherent coating previously applied to the fibrous mat. Thus, on setting, a strong adherent bond is formed between the set gypsum and the pre-coated fibrous mat. In part because of the coating on the surface of the mat, the slurry does not penetrate completely through the mat.

As is common practice in the manufacture of conventional paper-faced gypsum board, the two opposite edge portions of the sheet (16) are progressively flexed upwardly from the mean plane thereof and then turned inwardly at the margins as to provide coverings for the edges of the resulting board. One of the benefits of the pre-coated mat used in connection with the present invention is that it has shown sufficient flexibility to form acceptable board edges.

In a preferred embodiment of the invention, another fiber mat (14), also supplied in roll form and made in the same fashion as mat (16), is taken from the roll and fed around a roller (7) onto the top of the gypsum slurry (23) to form facing sheet (9), thereby sandwiching the gypsum slurry (core) between the two moving pre-coated glass fiber sheets. The fiber mats (16) and (14) thus form facings on the set gypsum core that is formed from the gypsum slurry to produce the gypsum board with opposite fiber mat facers. Alternatively, mat (14) may be uncoated and in that case preferably is made from a blend of glass fibers and polyester fibers as described in U.S. Pat. No. 5,883,024. One source of such a mat is Johns Manville mat 8802. The mat also could be a standard glass fiber mat. The mat (14) is applied to the top of the gypsum slurry. Thus, as above, a strong bond also is formed between this mat and the gypsum core as previously described.

Conventional shaping rolls and edge guiding devices (not shown) typically are used to shape and maintain the edges of the composite until the gypsum has set sufficiently to retain its shape. After the (top) fiber mat (14) is applied, the "sandwich" of fiber mats and gypsum slurry can be pressed to the desired thickness between plates (not shown). Alternatively, the fiber mats and slurry can be pressed to the desired thickness with rollers or in another manner. The continuous sandwich of slurry and applied facing materials then is carried by conveyor(s) (22). Slurry (23) sets as it is carried along.

Although improvements can be realized by the use of a gypsum core which has but one of its surfaces faced with the pre-coated fiber mat as described herein, it is believed that, for some applications, it may be advantageous to manufacture board having both surfaces faced with the pre-coated fiber mat. The weight of the board (nominal ½" thickness) usually should not exceed about 2500 lbs. per 1000 sq. ft. Typically, the board will weigh at least about 1600 lbs. per 1000 sq. ft.

The ability of the pre-coated fiber mat used in the present invention to pass water vapor therethrough is an important feature of the present invention and is such that the drying characteristics of the board are not substantially altered relative to a board faced with conventional paper facing. This means that industrial drying conditions typically used in continuous gypsum board manufacture also can be used in the manufacture of pre-coated mat-faced board of the present invention. Exemplary drying conditions include dryer (oven) temperatures of about 200° to about 700° F., with drying times of about 30 to about 60 minutes, at line speeds of about 70 to about 400 linear feet per minute.

The extent of drying also needs careful control to insure that the resulting board can adequately be used for supporting tiles, insulating material (e.g., foam insulation) or other exterior finishing materials on the surface of the pre-coated mat. Too much drying can result in surface calcination of the gypsum and a reduction in bond strength between the pre-coated mat and the gypsum core. In this regard, applicants have determined that the amount of combined water must be at least 17% (fully hydrated gypsum has a level of combined water of about 21%) in the vicinity of the facer-core interface.

The level of calcination (combined water) in the mat facer-gypsum core interface is measured using an O'Haus Moisture Balance Model No. MB 200 and the following procedure. Representative samples (12 inches by 8 inches) of the board product are collected. The coated glass mat facer is peeled from the sample and the board is placed on a surface suitable for collecting the scrapings generated in the next step. A two foot square piece of paper should be suitable. The entire exposed surface is carefully scraped off of the board to a depth of about 10 mils (0.254 mm) to remove the surface interface. At least 10 g of scrapings are collected, screened through a 50 mesh screen to remove any glass fibers and then tested for Combined Water using the O'Haus Moisture Balance set at 205° C. and 25 minutes. The change in weight provides the percent of combined water.

Boards of the present invention can be used effectively in many outdoor applications in addition to those previously mentioned. The board is particularly suitable for applications where tiles, insulating material or other construction materials, such as exterior finishing materials are supported by the gypsum board. For example, the gypsum board can be used in applications of the type where conventional gypsum sheathing is applied as a support surface for overlying materials such as wood siding, stucco, synthetic stucco, aluminum, brick, including thin brick, outdoor tile, stone aggregate and marble. The aforementioned finishing materials can be used advantageously in a manner such that they are adhered directly to the coated board. The board of the present invention has the necessary tensile strength to satisfactorily support such materials. The board of the present invention can also be used also as a component of exterior insulating systems, commercial roof deck systems, and exterior curtain walls. In addition, the board can be used effectively in applications not generally involving the use of paper-faced gypsum board. Examples of such applications include walls associated with saunas, swimming pools, gang showers, or as a substrate or component of a secondary weather barrier.

The examples that follow are illustrative, but are not to be limiting of the invention.

EXAMPLE 1

Pre-coated fibrous mats have been prepared by first preparing the following coating composition.

| Ingredients | Amounts, wt. % |
|---|---|
| Aqueous acrylic latex (45% solids) (NeoCar ® 820) | 18.7 |
| Limestone (GFP 102 from Global Stone Filler Products) | 65.3 |
| Ethyl hydroxyethyk cellulose thickener/stabilizer Bermocoll 230FQ | 0.04 |
| Acrylate thickeners Paragum 501, 109 | 0.19, 0.19 |
| Colorant Englehard W 1241 | 0.47 |
| Ammonia | 0.37 |
| Added water | 14.74 |

The aqueous coating composition has been applied to Johns Manville 7594 fiberglass mat at application rates of about 30 grams per square foot (about 66 pounds per 1000 square feet). The wet coating composition was dried. The dried basis weight of the coating was about 22 grams per square foot (about 48 pounds per 1000 square feet).

EXAMPLE 2

Pre-coated fiberglass mat obtained in the manner of Example 1 was used to prepare gypsum board panels. The pre-coated mat had a thickness of about 35 mils and a porosity of about 10 seconds.

Continuous length boards were made from a gypsum slurry containing about 55% percent by weight of gypsum hemihydrate and the pre-coated mats on a conventional wallboard machine. The slurry was deposited on one continuous sheet of the coated mat, which was advanced at a rate of about 185 linear feet per minute, sufficient to form ⅝th inch thick boards, while a continuous sheet of Johns Manville 8802 fibrous mat was deposited onto the opposite surface of the gypsum slurry. Drying of the gypsum boards was accelerated by heating the composite structures in an oven at about 600° F. for about thirty minutes and until the boards are almost dry and then at 250° F. for about fifteen minutes until they are dried completely. The densities of the coated mat-faced boards were determined to be about 50 lb. per cu. ft.

Coated mat-faced gypsum boards made in accordance with the present invention are capable of resisting for indefinite periods of time attack by water, both in indoor and outdoor applications, and to offer significantly enhanced fire resistance. In summary, it can be said that the improved gypsum-based product of the present invention has water-tolerant properties which are at least equal to or better than prior art products, and that this is achieved in a product that is obtained in a product that is as light as and more economical to make than prior art products.

EXAMPLE 3

Selected gypsum boards made with pre-coated mats were tested to assess the bond strength between the pre-coated mat facer and the gypsum core.

In order to support tiles, insulating material or other construction materials, such as exterior finishing materials from the pre-coated mat surface of the board, the bond between the gypsum core and the mat facer must have a sufficient strength. In particular, it has been determined that the tensile strength of that bond should be at least 16 psi when tested in accordance with the following procedure.

A 5.5 inch square sample for testing is prepared from a gypsum board. An expanded polystyrene board (EPS) then is adhered to the gypsum board sample. An EPS board, nominal 2 pound, one inch thick (typical of EPS insulation), cut into a 3.5 inch square, is suitable. A suitable adhesive is a 1:1 mixture of Type I Portland cement and Dryvit Primus adhesive mixed with water to a suitable consistency for applying it to EPS board. This adhesive requires about two weeks to cure.

Thereafter, a wood block (1.5 inches thick) is glued to the free side of the EPS board using a fast curing (e.g., five minute) epoxy. The wood block is sized to match the EPS board (3.5 inches square) and is provided with two slots on opposite edges to permit its attachment to the tensile test equipment. Using a Satec Universal Testing Machine (Model UTC60HVL-1437), the slots should be one-quarter inch wide and three-quarter inch deep. The slots should be cut on the edges of the block that are perpendicular to the grain of the wood. The sample should be ready for testing in approximately one hour.

The specimen is attached to the test equipment and the machine is set to operate in the 0 to 600 pound range at a speed of one inch per minute. During the test, the gypsum board is pulled from the EPS board as the wood block restrains the sample. The machine is run until the maximum load has been reached and the specimen has failed. The final result for a specific board is preferably the average of three samples.

The Table below lists the tensile test results of several samples that were prepared with pre-coated mats. The mats had different degrees of coating penetration. The boards were prepared on commercial board lines using standard production techniques. Samples 1, 2 6 and 7 were made using a coating formulation of the type described in U.S. Published application 2002/0155282. Sample 1 was made using a Venrotex fiber glass mat having a basis weight of 2.1 lb per 100 square feet. Samples 6 and 7 used a glass fiber mat having a basis weight of 1.4 pound per 100 square feet of the type described in U.S. Published application 2002/0155282. Sample 2 used a Johns-Manville fiber glass mat. Sample 3, 4 and 5 were made using a Johns-Manville mat and a coating formulation as describe in Examples 1 and 2. The gypsum boards of sample 1, 2 and 3 were ⅝ inch thick, while the remaining samples were ½ thick boards.

| Sample No. | Coating Penetration (mils) | Percent Coating Penetration | Avg. Board Tensile (psi) |
|---|---|---|---|
| 1 | 15 | 43.6 | 19.5 |
| 2 | 11.6 | 37.7 | 17.1 |
| 3 | 12.9 | 34.4 | 18.6 |
| 4 | 11.8 | 29.9 | 18.6 |
| 5 | 6.9 | 19.7 | 13 |
| 6 | 14.1 | 64 | 0* |
| 7 | 13.9 | 58 | 0* |

*Reject board severe blistering after exiting the dryer.

It will be understood that while the invention has been described in conjunction with specific embodiments thereof, the foregoing description and examples are intended to illustrate, but not limit the scope of the invention. Unless otherwise specifically indicated, all percentages are by weight.

Throughout the specification and in the claims the term "about" is intended to encompass + or −5%.

Other aspects, advantages and modifications will be apparent to those skilled in the art to which the invention pertains, and these aspects and modifications are within the scope of the invention, which is limited only by the appended claims.

The invention claimed is:

1. A gypsum board comprising:
   a gypsum core;
   a fiber mat comprising a first side and second side opposite the first side, the second side is bonded to the gypsum core such that a tensile strength of the bond is at least 16 pounds per square inch, wherein the gypsum core in the region of the bond has at least 17 percent combined water; and
   a coating penetrating the mat from the first side into the fiber mat to a depth of about 30 percent to about 50 percent of the thickness of the fiber mat, the coating comprises a mineral pigment and an organic binder, wherein the organic binder comprises at least about 1 percent and no more than 17 percent by weight and the mineral pigment has a particle size such that at least 95 percent by weight of the mineral pigment particles pass through a 100 mesh wire screen, with at least 75 percent of the particles by number being greater than 5 microns.

2. The gypsum board of claim 1, wherein the fiber mat comprises glass fibers nominally about 10 to 16 microns in diameter and about one-quarter (¼) to about one (1) inch in length, the fiber mat in the absence of the coating has a basis weight of 1 to 3 pounds per 100 square feet, and the fiber mat has a thickness from about 0.02 inch to about 0.045 inch.

3. The gypsum board of claim 1, wherein the coating penetrates the mat about 35 percent to about 50%.

4. The gypsum board of claim 1, wherein the coating weighs on a dry weight basis about 30 to 100 pounds per 1000 square feet of mat.

5. The gypsum board of claim 4, where the coating has a microporosity, as measured by a modified Gurley method, of less than about 45 seconds.

6. The gypsum board of claim 5, wherein the microporosity is less than about 20 seconds.

7. The gypsum board of claim 6, wherein the microporosity is between 5 and 20 seconds.

8. The gypsum board of claim 1, wherein the mineral pigment has a number average particle size of about 40 microns.

* * * * *